United States Patent
Garrett et al.

(10) Patent No.: US 8,191,368 B2
(45) Date of Patent: Jun. 5, 2012

(54) VARIABLE GEOMETRY TURBINE WITH WASTEGATE

(75) Inventors: Stephen Garrett, Huddersfield (GB); John Parker, Huddersfield (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 123 days.

(21) Appl. No.: 12/848,729

(22) Filed: Aug. 2, 2010

(65) Prior Publication Data

US 2011/0011085 A1 Jan. 20, 2011

Related U.S. Application Data

(63) Continuation of application No. PCT/GB2008/004149, filed on Dec. 16, 2008.

(51) Int. Cl.
| | |
|---|---|
| F02D 23/00 | (2006.01) |
| F02G 3/00 | (2006.01) |
| F01B 25/02 | (2006.01) |
| F01D 17/12 | (2006.01) |
| F03D 7/00 | (2006.01) |
| F04D 15/00 | (2006.01) |
| F04D 27/00 | (2006.01) |
| F04D 29/44 | (2006.01) |
| F04D 29/56 | (2006.01) |

(52) U.S. Cl. ............. 60/602; 60/615; 415/157; 415/158
(58) Field of Classification Search ............. 60/602, 60/615; 415/157, 158
See application file for complete search history.

(56) References Cited

U.S. PATENT DOCUMENTS

| | | | |
|---|---|---|---|
| 4,655,040 A | 4/1987 | Parker | |
| 5,522,697 A * | 6/1996 | Parker et al. | 415/158 |
| 6,203,272 B1 * | 3/2001 | Walsham | 415/158 |
| 6,729,134 B2 * | 5/2004 | Arnold et al. | 60/602 |
| 6,931,849 B2 * | 8/2005 | Parker | 60/602 |

(Continued)

FOREIGN PATENT DOCUMENTS

DE 38 39 968 5/1990

(Continued)

OTHER PUBLICATIONS

United Kingdom Search Report GB0801846.7, Cummins Turbo Technologies Limited, May 15, 2008.

(Continued)

*Primary Examiner* — Thomas Denion
*Assistant Examiner* — Cameron Setayesh
(74) *Attorney, Agent, or Firm* — Krieg DeVault LLP; Matthew D. Fair, Esq.

(57) ABSTRACT

A variable geometry turbine comprises a turbine wheel (5) supported in a housing for rotation about a turbine axis with an annular inlet passageway (9) defined between a radial face of a nozzle ring (11) and a facing wall of the housing (10). The nozzle ring is movable along the turbine axis to vary the width of the inlet passageway and has a circumferential array of vanes (20) that are received in corresponding slots (24) in the facing wall. A wastegate valve (15) is provided in a chamber behind the facing wall and gas bypasses the turbine through the chamber to the wastegate port (14) at high flow rates.

38 Claims, 3 Drawing Sheets

U.S. PATENT DOCUMENTS

| | | | |
|---|---|---|---|
| 7,024,855 B2* | 4/2006 | Perrin et al. | 60/602 |
| 7,475,540 B2* | 1/2009 | Parker | 60/602 |
| 7,581,394 B2* | 9/2009 | Perrin et al. | 60/602 |
| 7,861,525 B2* | 1/2011 | Haugen | 60/612 |
| 7,930,888 B2* | 4/2011 | Parker | 60/602 |
| 2003/0014972 A1* | 1/2003 | Arnold | 60/602 |
| 2004/0128997 A1* | 7/2004 | Parker | 60/602 |
| 2005/0060999 A1* | 3/2005 | Mulloy et al. | 60/602 |
| 2005/0262841 A1* | 12/2005 | Parker | 60/602 |
| 2006/0010864 A1* | 1/2006 | Mulloy et al. | 60/602 |
| 2006/0037317 A1 | 2/2006 | Leavesley | |
| 2006/0179839 A1* | 8/2006 | Kuster | 60/602 |
| 2008/0089782 A1* | 4/2008 | Parker et al. | 415/150 |
| 2010/0037605 A1* | 2/2010 | Garrett et al. | 60/602 |
| 2011/0232282 A1* | 9/2011 | Anschel et al. | 60/615 |

FOREIGN PATENT DOCUMENTS

| | | |
|---|---|---|
| DE | 10 2006 014934 A1 | 10/2007 |
| EP | 0 034 915 | 9/1981 |
| WO | WO 2004/048755 | 6/2004 |
| WO | WO 2006/102912 A1 | 10/2006 |
| WO | WO 2007/031752 A1 | 3/2007 |
| WO | WO 2007/045874 | 4/2007 |

OTHER PUBLICATIONS

International Search Report, PCT/GB2008/004914, Apr. 7, 2009, Cummins Turbo Technoligies Limited.

* cited by examiner

VARIABLE GEOMETRY TURBINE WITH WASTEGATE

CROSS REFERENCE TO RELATED APPLICATIONS

The present application is a continuation of PCT/GB2008/004149 filed Dec. 16, 2008, which claims priority to United Kingdom Patent Application No. 0801846.7 filed Feb. 1, 2008, each of which is incorporated herein by reference.

The present invention relates to a variable geometry turbine with a wastegate. It also relates to methods of controlling a variable geometry turbine. More particularly, but not exclusively, it relates to a variable geometry turbocharger.

Turbochargers are well known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housings.

The turbine stage of a conventional turbocharger comprises: a turbine housing defining a turbine chamber within which the turbine wheel is mounted; an annular inlet passageway defined in the housing between facing radially extending walls arranged around the turbine chamber; an inlet arranged around the inlet passageway; and an outlet passageway extending from the turbine chamber. The passageways and chamber communicate such that pressurised exhaust gas admitted to the inlet flows through the inlet passageway to the outlet passageway via the turbine chamber and rotates the turbine wheel. Vanes may be provided in the inlet passageway so as to deflect gas flowing through the inlet passageway towards the direction of rotation of the turbine wheel.

There is a constant requirement to increase the flow capacity of a turbine whilst improving its efficiency. One approach to meeting this need is to fit the turbine with a valve controlled bypass port referred to as a "wastegate" which can be controlled to vary the flow capacity of the turbine whilst enabling control of the turbocharger boost pressure and/or shaft speed. As the engine speed increases the wastegate valve (typically a poppet type valve) is controlled to open the wastegate port when the pressure of the boost air increases towards a predetermined level, thus allowing some of the exhaust gas to bypass the turbine wheel. This serves to increase the flow capacity of the turbine whilst limiting the turbocharger speed. Typically the wastegate port opens into a bypass passageway which diverts the bypass gas flow to the turbine outlet or vents it to atmosphere. Such a wastegate is often provided at a radial position adjacent to the inlet volute of the turbine. A cover plate is provided to direct bypassed exhaust gas to the outlet. This plate can be removed to access the wastegate valve mechanism or to facilitate machining of the valve seat surface.

An alternative approach to increasing flow capacity is to use a turbine of the variable geometry type. Variable geometry turbines differ from fixed geometry turbines in that the size of the inlet passageway can be varied to optimise gas flow velocities over a range of mass flow rates so that the power output of the turbine can be varied to be in line with varying engine demands. For instance, when the volume of exhaust gas being delivered to the turbine inlet is relatively low, the size of the annular inlet passageway is reduced so as to maintain the velocity of the gas reaching the turbine wheel and to ensure efficient turbine operation. Similarly, at high engine speeds and exhaust gas flow the annular inlet passageway size is increased to avoid turbocharger over speed and to maintain the required boost pressure generated by the compressor. Turbochargers provided with a variable geometry turbine are referred to as variable geometry turbochargers.

Variable geometry turbines typically comprise either an axially movable wall member generally referred to as a "nozzle ring" that is adjustable to vary the size of the inlet passageway or a variable guide vane array comprising adjustable swing guide vanes arranged to pivot so as to open and close the inlet passageway.

Although the flow through a variable geometry turbine does increase the flow capacity, the turbine efficiency is relatively low at the ends of the flow rate range. For low flow rates the efficiency can be improved by selecting a smaller turbocharger but such a device would not be usable at the desired maximum flow rate.

It is one object of some embodiments of the present invention to provide an improved or an alternative variable geometry turbocharger.

According to a first aspect of the present invention there is provided a variable geometry turbine comprising:
a turbine housing having an inlet and an outlet;
a turbine wheel arranged for rotation about an axis in the housing between the inlet and outlet;
the inlet comprising a substantially annular inlet passageway defined between a substantially radial or radial face of a first wall and a facing second wall of the housing, the walls being movable relative to one another along the turbine axis to vary the size of the inlet passageway;
a substantially annular array of vanes extending across said inlet passageway for directing exhaust gas flow towards the turbine wheel, each vane being fixed to one of the first and second walls and a respective opening for receiving the vane being provided in the other of the first and second walls to accommodate said relative movement of the walls;
a chamber adjacent to the second wall, the second wall being disposed between the chamber and the first wall; and
a wastegate port disposed in the chamber providing communication between the chamber and the outlet of the turbine housing; a bypass path being provided from the inlet passageway to the chamber for gas to bypass the turbine wheel.

The term "radial face" is intended to mean a face that extends in a generally radial direction and does not exclude such a face having a small axial component.

The chamber may be substantially annular and may be defined by walls of the housing.

In one embodiment the vanes may be fixed to the first wall and the respective openings for receiving the vanes are defined in the second wall. In this instance the chamber serves to accommodate the vanes that project through the openings. In an alternative arrangement the vanes are fixed to the second wall and the openings are provided in the first wall. In both arrangements the first wall may move relative to the second wall which is fixed, or vice versa. It is to be understood that vanes may be provided on both the first and second wall with the wall opposite that to which a vane is fixed defining a respective opening for that vane.

The vanes may have a leading edge and a trailing edge, the leading edge being radially outboard of the trailing edge with respect to the turbine wheel axis.

The wastegate port may be provided at a distance from the axis that is substantially equal to or less than the distance of the vanes from the axis. For example, the centreline of the port may be disposed at a distance from the axis that is less than the distance between the centreline of the vanes and the axis or, alternatively, less than the distance of the leading edge of the vanes to the axis. The vane is generally in the form of an airfoil and the centreline is defined as the line that is equidistant the leading and trailing edges of the vane i.e. the midpoint of the vane chord.

The wastegate port is preferably closable by a valve which can be of any suitable form such as, for example, a disc or poppet valve or a movable sleeve. The port may be provided at an end of the chamber distal from the second wall.

The present invention allows the wastegate port to be conveniently located relatively close to the axis of the turbine, if desired. In particular, it may be located at a distance from the axis that is generally the same as, or is less than, that occupied by the vanes. This relatively close proximity to the axis allows the wastegate port to be located in an exducer passage of the turbine outlet. More particularly it may be in a wall that defines the exducer passage or adjacent to a wall that defines the exducer passage. The exducer passage is defined by the turbine outlet and in particular a wall of the outlet that is downstream of the turbine wheel.

The walls may be movable between a first position in which first and second walls are spaced apart to define a relatively wide annular inlet passageway and a second position in which the first and second walls are proximate so as to define a relatively narrow annular inlet passageway.

The second wall may extend in any suitable direction provided it is facing the first wall so as to define the inlet passageway and the opening in the wall can receive the vane. The second wall may be defined by a shroud plate. The first wall may be a nozzle ring.

The openings in the second wall may be in the form of slots. Each slot may be designed to receive a respective vane.

The bypass path may be provided (at least partially) by the openings in the second wall.

The vanes may have an end that is cut away such that it has a reduced vane chord. In the second position of the walls there may be only a slight (negligible) peripheral clearance between the vanes and edges of the openings thereby substantially closing the bypass path. In the first position of the walls the cut away end of each vane occupies the respective opening such that the clearance between the vanes and the edges of the openings is larger than in said first position thereby opening the bypass path.

The valve may be operable independently of the movement of the walls.

The valve may rest on a valve seat in the closed position, the seat being defined in a wall adjacent to the exducer passage of the turbine, that is the wall in which the exducer portion of the turbine wheel is received.

In an alternative configuration the bypass path is defined between an inlet chamber, which may be a volute, and the chamber. A bypass port may be provided in a wall between an inlet chamber, such as an inlet volute, and the chamber and the wastegate port being provided between the chamber and the outlet. The inlet chamber delivers gas to the inlet passageway and is preferably radially outboard of the inlet passageway.

The bypass port may be further from the axis than the wastegate port.

The valve may be in the form of valve member defined on the ends of the vanes and movable over the bypass port such that when the walls are in the second position the valve member blocks gas communication between the bypass and the wastegate ports and when the walls are in the first position the valve member is clear of the bypass port so that bypass gas can flow from the inlet chamber through the bypass port and to the outlet and the exducer passage via the wastegate port.

In one embodiment the first wall is movable along said axis and the second wall is fixed. Alternatively the first wall may be fixed and the second wall movable. As a further alternative both walls may be movable along said axis.

The second wall also may have vanes fixed thereto and the first wall may have corresponding openings for receiving the respective vanes.

According to a second aspect of the present invention there is provided a turbocharger comprising a variable geometry turbine as defined above and drivingly connected to a compressor.

According to a third aspect of the present invention there is provided a method for operating a variable geometry turbine in which the size of an inlet passageway defined between a substantially radial face of a first wall and a facing second wall of a housing of the turbine is varied by moving the walls relative to one another along the turbine axis, further comprising the steps of using a plurality of vanes fixed to one of the first and second walls and extending across the inlet passageway outside the turbine wheel to direct exhaust gas flow toward the turbine wheel, the vanes passing through openings in the other of the first and second walls to accommodate the relative movement, a chamber being provided on one side of the second wall, and selectively opening a bypass path so as to allow at least a portion of the exhaust gas to bypass the turbine through the chamber and to exit through a wastegate port in the chamber.

The bypass path may include the openings in the second wall, the path being opened and closed by relative movement of the vanes and the openings between a first position in which vanes substantially close the openings and therefore the bypass path and a second position in which there is a significant clearance between the vanes and the openings so as to open the bypass path. Alternatively the bypass path may include a bypass port defined between the chamber and an inlet chamber, which may be a volute.

The first and second walls may be moved relative to one another so as to reduce the size of the inlet passageway such that the vanes are received, at least partially, within the chamber.

According to a fourth aspect of the present invention there is provided a turbocharger, as defined above and fitted to an internal combustion engine.

Specific embodiments of the present invention will now be described, by way of example only, with reference to the accompany drawings, in which.

Referring now to FIGS. 1 to 4, the exemplary variable geometry turbocharger comprises a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4*a* on bearing assemblies located in the bearing housing.

Figure 1:
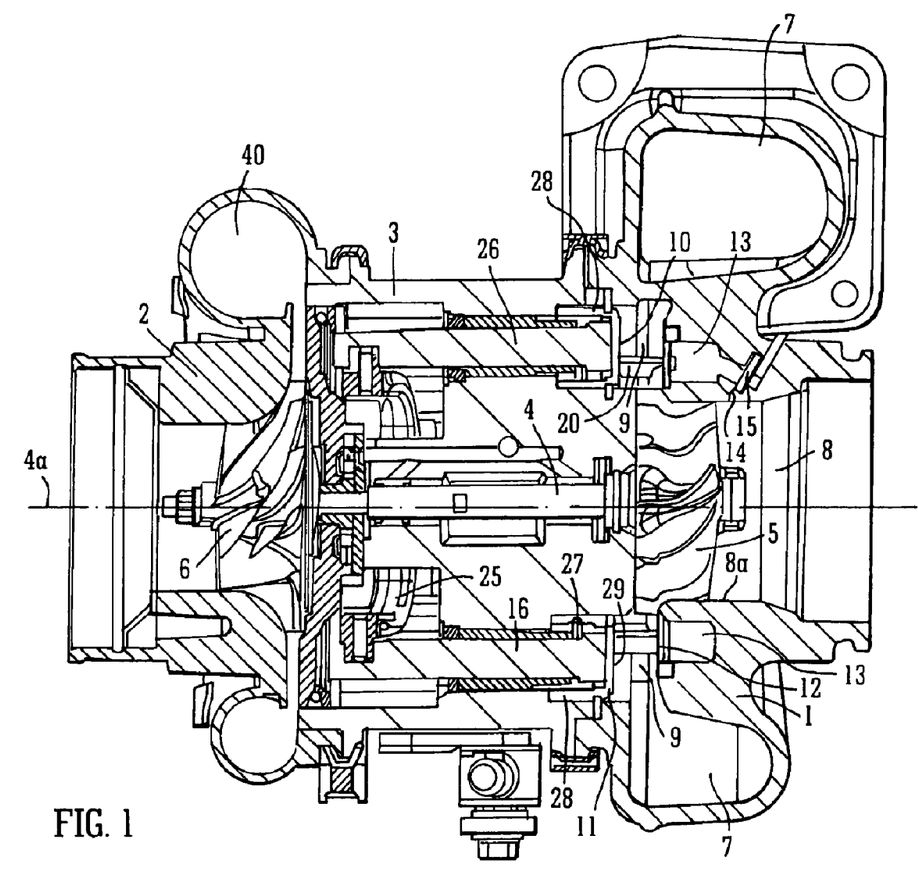
FIG. 1 is an axial cross-section through a variable geometry turbocharger in accordance with the present invention.

The turbine housing 1 defines an inlet chamber in the form of a volute 7 to which exhaust gas from an internal combustion engine (not shown) is delivered. The exhaust gas flows from the inlet volute 7 radially inwards to an annular inlet passageway 9 then via the turbine wheel 5 to an axially extending outlet 8 that includes an exducer passage 8*a* extending from the turbine wheel. The inlet passageway 9 is defined on one side by the face 10 of a radial wall of a movable annular wall member 11, commonly referred to as a "nozzle ring", and on the opposite side by an annular shroud plate 12 which forms the wall of the inlet passageway 9 facing the nozzle ring 11. The shroud plate 12 covers the opening of an annular chamber 13 in the turbine housing 1.

The annular chamber 13 is selectively connectable to the exducer passage 8*a* of the turbine via a wastegate port 14 defined at the end distal from the shroud plate 12. The port 14 is closable by a pivotal disc valve 15 of conventional configuration and which rests on a valve seat 16 defined around the port 14. The disc or poppet valve 15 is pivotable between a first position in which it is seated and covers the port 14 so as to prevent any communication with the exducer passage 8*a* and a second position where it is lifted from its seat so as to allow flow. The movement of the disc 15 is effected by manual or automatic rotation of a cranked arm 17 that is rotatably supported in a bush bearing 18 in the wall of the turbine housing 1.

The nozzle ring 11 supports an array of equi-angularly spaced inlet vanes 20 each of which extends axially across the inlet passageway 9. The vanes 20 are orientated to deflect gas flowing through the inlet passageway 9 towards the direction of rotation of the turbine wheel 5. The axial length (the direction substantially parallel to the axis 4*a* of the turbine) of each vane 20 is referred to as its height, whereas the vane width, or chord length, is the distance between leading and trailing edges 21, 22 relative to the radial flow of the exhaust gas passing through the inlet passageway 9. The ends of the vanes 20 furthest from the ring 11 are cut away at their radially inner trailing edges 22 to define a portion 23 of reduced height and reduced chord length. When the nozzle ring 11 is proximate to the annular shroud plate 12, the vanes 20 project through suitably configured slots 24 in the shroud plate 12, into the chamber 13.

Figure 3:
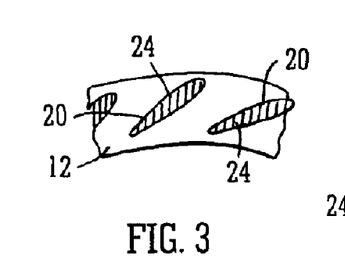
FIG. 3 is a schematic sectioned view showing vanes of the variable geometry turbine nozzle ring received in slots of part of a shroud plate in one axial position.

There is a peripheral clearance between the vanes 20 and the edges defining the slots 24 as illustrated in FIG. 3. A very small or negligible flow of gas can thus escape through the clearances into the chamber 13 when the nozzle ring 11 is proximate the shroud plate 12. When the vanes 20 are retracted from the shroud plate 12 so as to open the inlet passageway 9 the reduced height portions 23 are brought into alignment with the slot edges so that there is greater clearance between the vanes 20 and the edges of the shroud plate 12. This allows a greater volume of gas to flow into the chamber 13 behind the shroud plate 12 and out through the wastegate port 14.

An actuator (not shown) is operable to control the position of the nozzle ring 11 via an actuator output shaft (not shown), which is linked to a stirrup member 25. The stirrup member 25 in turn engages axially extending guide rods 26 that support the nozzle ring 11. Accordingly, by appropriate control of the actuator (which may for instance be pneumatic, hydraulic or electric), the axial position of the guide rods 26 and thus of the nozzle ring 11 can be controlled. It will be appreciated that details of the nozzle ring mounting and guide arrangements may differ from those illustrated.

The nozzle ring 11 has axially extending radially inner and outer annular flanges 27 and 28 that extend into an annular cavity 29 provided in the turbine housing 1 and the bearing housing 3. Inner and outer sealing rings 30 and 31 (FIG. 2) are provided to seal the nozzle ring 11 with respect to inner and outer annular surfaces of the annular cavity 29 respectively, whilst allowing the nozzle ring 11 to slide within the annular cavity 29 in an axial direction. The inner sealing ring 30 is supported within an annular groove formed in the radially inner annular surface of the cavity 29 and bears against the inner annular flange 27 of the nozzle ring 11. The outer sealing ring 30 is supported within an annular groove formed in the radially outer annular surface of the cavity 19 and bears against the outer annular flange 28 of the nozzle ring 11. It will be appreciated that the inner and/or outer sealing rings could be mounted in a respective annular groove in the nozzle ring flanges rather than as shown.

Exhaust gas flowing from the inlet volute 7 to the outlet exducer passage 8 passes over the turbine wheel 5 causing it to rotate and, as a result, torque is applied to the shaft 4 to drive the compressor wheel 6. Rotation of the compressor wheel 6 within the compressor housing 2 pressurises ambient air and delivers the pressurised air to an air outlet volute 40 from which it is fed to an internal combustion engine (not shown). The speed of the turbine wheel 5 is dependent upon the velocity of the gas passing through the annular inlet passageway 9. For a fixed rate of mass of gas flowing into the inlet passageway, the gas velocity is a function of the gap between the nozzle ring 11 and the shroud 12 that defines the passageway 9 and is adjustable by controlling the axial position of the nozzle ring 11 (as the inlet passageway 9 gap is reduced, the velocity of the gas passing through it increases).

Figure 2:
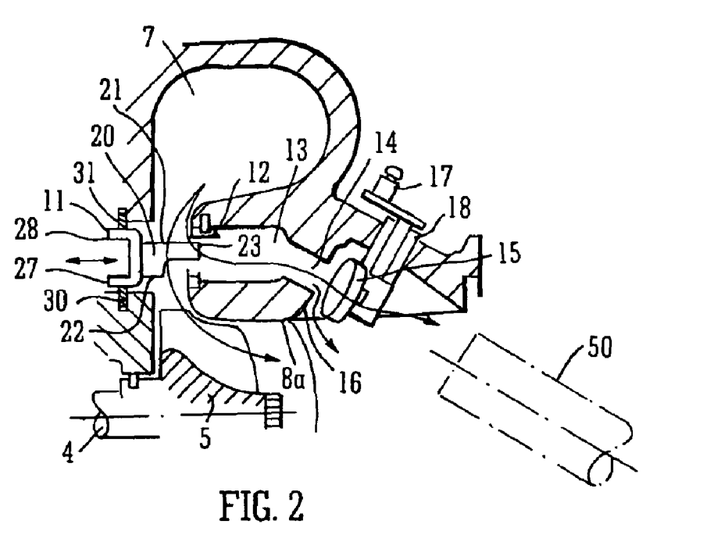
FIG. 2 is a schematic enlarged view of part of the turbine of the variable geometry turbocharger of FIG. 1.
Figure 4:
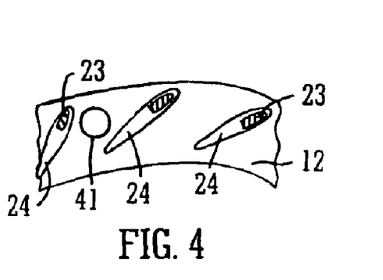
FIG. 4 is a schematic sectioned view showing the vanes of FIG. 3 in another axial position.

In FIGS. 2 and 4 the nozzle ring is in a position that leaves the annular inlet passageway 9 fully open i.e. the gap between the nozzle ring face 10 and the shroud 12 is relatively large. The position shown is not necessarily the 'fully' open position, as in some turbochargers it may be possible to withdraw the nozzle ring 11 further into the nozzle ring cavity 29. As described above, in this position the reduced height portion 23 of the vanes 20 occupies the slots and affords a greater clearance so that gas may egress through to the annular chamber. The wastegate valve 15 may be opened at relatively high flow rates so that a proportion of the exhaust gas entering the inlet passageway 9 bypasses the turbine through the shroud slots 24 to the annular chamber 13 and out through the wastegate port 14. The ability to bypass exhaust gas in this manner effectively extends the capacity of the turbine once the inlet passageway 9 is fully open and ensures that the turbine does not over speed at high flow rates. Additional holes 41 (one example shown in FIG. 4) may be optionally provided in the shroud plate 12 if more flow is required to flow this way or if the pressure drop across the shroud plate is unacceptable.

In FIG. 3 the nozzle ring 11 is shown in a reduced opening position in which the face 10 of the nozzle ring 11 is moved closer to the shroud 12 to reduce the width of the inlet passageway 9. Here the vanes 20 occupy the shroud plate slots 24 such that little or negligible exhaust gas escapes to the annular chamber 13.

Figure 5:
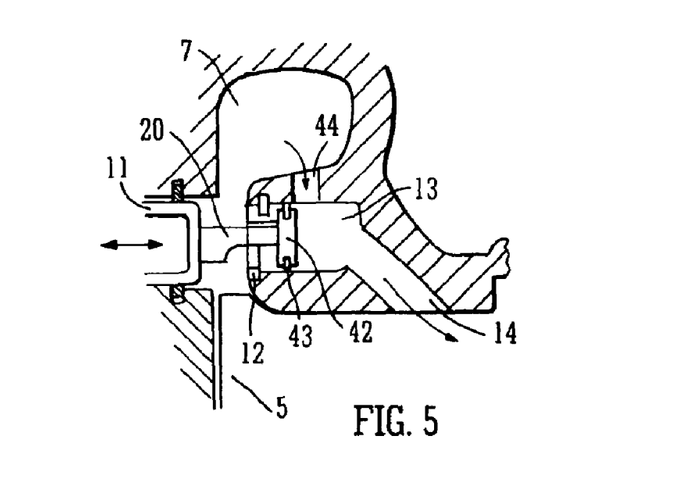
FIG. 5 is a sectioned side view of an alternative embodiment of a variable geometry turbine in accordance with the present invention.

In the alternative embodiment illustrated in FIG. 5, the bypass flow to the wastegate port 14 is directed into the annular chamber 13 behind the shroud from the inlet volute 7 rather than through the slots 24 in the shroud plate 12.

A piston 42 with a sealing ring 43 about its periphery is connected to the tip of each vane 20 and seals it to the annular chamber 13. The sealing ring 43 prevents flow back to the turbine wheel through the shroud slots 24. The piston 42 is movable in the axial direction in the annular chamber 13 with the vanes 20. A bypass (outer) port 44 is provided between the inlet volute 7 and the annular chamber 13 and the (inner) wastegate port 14 is provided between the annular chamber 13 and the exducer passage 8*a*. With the vanes 20 in the axial position shown in FIG. 5 the piston 42 is disposed such that the bypass and wastegate ports 44, 14 are in communication via the annular chamber 13 and gas can bypass the turbine wheel 5 via the chamber 13 to the exducer passage 8*a*. When the inlet passageway 9 is reduced in width the piston 42 moves over the bypass port 44 and seals it from communication with the wastegate port 14 thus closing the wastegate and preventing gas bypass. The cross section of the bypass port 44 may be shaped to vary the amount of bypass flow with the axial position of the piston 42. The characteristic can be similarly shaped by adjusting the relative positions of the bypass port 44 and the vane tips. The wastegate port 14 may be closable by a valve of the kind shown in FIG. 2. The piston may take any suitable form according to the shape of the chamber 13. It may be connected to one or more of the vanes and may be integral therewith. It will be understood that in such a configuration it may be provided with sealing rings on its inner and outer periphery for sealing against the walls of the chamber 13.

It is to be understood that the embodiment of FIG. 5 may be combined with the embodiment of FIG. 3 if extra bypass flow is required when the vanes are fully engaged in the shroud plate. In such a design the port 44 (from the embodiment shown in FIG. 5) allows bypass flow even when the vanes are fully engaged and limit the volume of bypass flow through the shroud plate.

Figure 6:
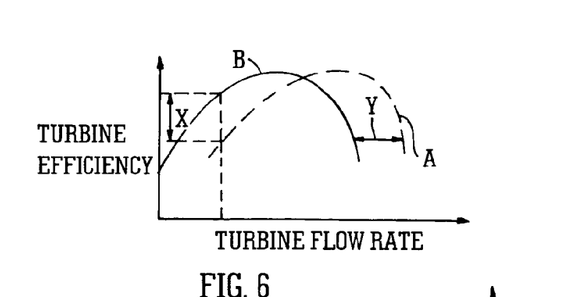
FIG. 6 is a graph showing a plot of gas flow rate (x axis) against efficiency (y axis) for two turbine sizes.

Using a wastegate with a variable geometry turbine allows the design of the turbine to be optimised for low flows but extends the high flow end of the characteristic by opening of the wastegate. In FIG. 6 it can be seen that a simple scaling down of the size of the turbine provides for improved efficiency at low flow rates (line X illustrates the improvement in efficiency at a given relatively low flow rate) but this compromises the maximum flow capacity (represented by arrow Y). The graph shows the efficiency of a turbine A compared with a smaller turbine B.

Figure 7:
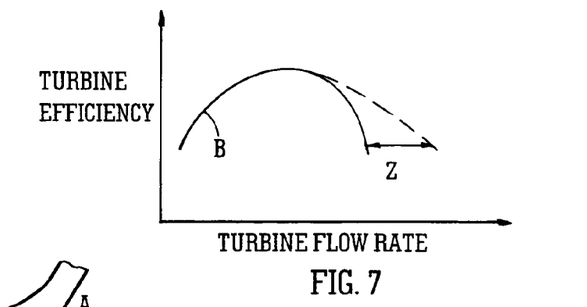
FIG. 7 is a graph showing the change in higher flow rates for a turbine in accordance with the present invention.

In FIG. 7 it can be seen that the opening of the wastegate port in the scaled down turbine B effectively extends the high flow end of the characteristic (as indicated by arrow Z).

In the embodiment of FIG. 2 the opening and closing of the wastegate port 14 is mechanically independent of the operation of the variable geometry turbine. In the embodiment of FIG. 5 the opening and closing is mechanically dependent on the positioning of the piston 42 and therefore the operation of the nozzle ring 11 of the variable geometry turbine.

Figure 8:
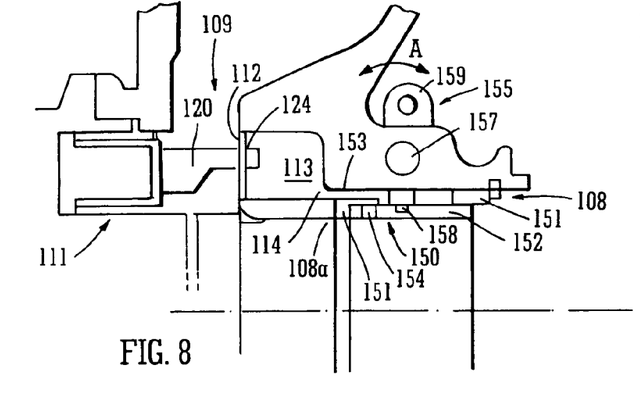
FIG. 8 is an axial cross-section through part of a further embodiment of a variable geometry turbine or a turbocharger.
Figure 9:
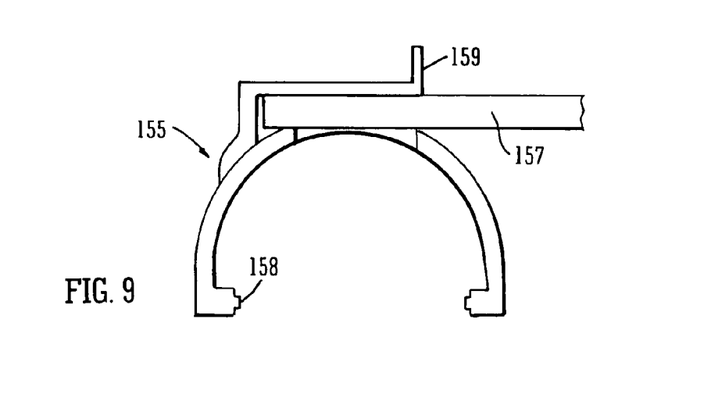
FIG. 9 is a schematic representation of a yoke mechanism for operating a wastegate valve of the turbine of FIG. 8.

An alternative embodiment of a variable geometry turbine for a turbocharger in accordance with the invention is shown in FIGS. 8 and 9. Components that are common to the embodiment of FIGS. 1 to 4 are given the same reference numbers but increased by 100 and are not further described in detail except in so far as they differ from their counterparts. There is again an annular inlet passageway 109 that is closable by a nozzle ring 111. The axially extending vanes 120 of the ring 111 are received in slots 124 in a shroud plate 112 and as the ring 111 is moved closer to the shroud plate they are received in the annular chamber 113. A wastegate port 114 is provided at the rear of the annular chamber 113 as before but this time it is selectively closable by a movable sleeve arrangement 150 rather than a poppet or disc valve, the arrangement 150 being provided downstream of the turbine in the region of the exducer passage 108*a*.

The movable sleeve arrangement 150 comprises a substantially cylindrical fixed outer sleeve 151 retained in the exducer passage 108*a* and/or the outlet 108 of the turbine housing and a concentric inner sleeve 152 slidably received in the outer sleeve 151. The wastegate port 114 is defined by a groove 153 in the exterior surface of one end of the outer sleeve 151, an end of the groove 153 being closable by the sleeve arrangement 150. Seals are provided between the inner and outer sleeves 152, 151 so as to prevent leakage of exhaust gas through the port 114 when it is closed. The inner sleeve 152 has a side port 154 towards one end for selective communication with the wastegate port 114 so that it is opened and exhaust gas is permitted to bypass the turbine along a path through the chamber 113, the wastegate port 114, the side port 154 and out of the outlet 108. The axial position of the inner sleeve 152 is controlled by a lever-operated yoke mechanism 155, shown in FIGS. 8 and 9, so as to slide between a first position where the side port 154 in the sleeve moves to the left as shown in FIG. 8 such that the communication with the bypass port 114 is blocked and a second position (not shown) where it moves to the right such that the side port 154 is in communication with the bypass port 114.

The yoke mechanism 155 comprises a pair of joined yoke arms 156 that are pivotally mounted on a shaft 157 and have with ends 158 that are pivotally connected to the side wall of the inner sleeve 152 at diametrically opposite locations. A lever 159 on the opposite side of the shaft 157 to the arms 156 is moved by a suitable actuator (e.g. a pneumatic actuator, a motor driven leadscrew, a solenoid or any other suitable actuator), as represented by arrow A in FIG. 9, such that the yoke arms 156 pivot about the shaft 157 and move the inner sleeve 152 in an axial direction relative to the fixed outer sleeve 151.

It is to be appreciated that any suitable actuator mechanism may be employed to operate the sliding sleeve arrangement. Moreover, it is to be understood that the inner sleeve may be rotatable relative to the outer sleeve (rather than slidable) to achieve the same result of bringing a side port into fluid communication with the wastegate port so as to open the wastegate.

Any suitable form of groove or recess (or a plurality thereof) in the inner and/or outer sleeves or in the wall of the housing that defines the outlet or exducer may define a passage or passages for the bypass flow. Indeed any form of clearance between the sleeve arrangement and the wall of the outlet that defines the passage may be adopted.

The embodiment of FIGS. 8 and 9 and the variations discussed above may be combined with the provision of a bypass passage 44 that extends between inlet volute 7 and the annular chamber 13 or 113 behind the shroud plate 112.

The embodiments of the invention conveniently provide for a wastegate port 14 (or 114) in the annular chamber 13 (or 113) behind the shroud 12 (or 112) such that it communicates with the exducer passage 8*a* (or 108*a*). In the embodiments of FIGS. 1 to 7 this radial positioning of the wastegate port 14 means that the seat 16 of the wastegate valve 15 can be cut into the wall of the exducer passage 8a (a schematic cutter 50 being represented in dotted line in FIG. 2 in order to convey the idea) and no additional cover plates with their associated weight, cost and machining are required to contain the wastegated flow after it passes through the port 14. The arrangement can be provided with little modification or adaption of existing turbocharger housings. Similarly it lends itself to an alternative valve mechanism such as the sliding sleeve arrangement 150 of FIGS. 8 and 9 without the need for significant modification.

It is to be understood that when the nozzle ring 11 or 111 is moved to the closed position a small flow of exhaust gas towards the turbine wheel may be provided by leak flow paths defined in the vanes or nozzle ring as is known in the art. These leak flow paths can be employed in engine braking or exhaust gas heating applications.

It is to be appreciated that numerous modifications to the above described embodiments may be made without departing from the scope of the invention as defined in the appended claims. For example, the exact shape and configuration of the nozzle ring, shroud, chamber and vanes may differ depending on the application. Furthermore, the position of the nozzle ring and the shroud plate may be interchanged such that the nozzle ring is adjacent to the chamber and the shroud plate is adjacent to the bearing housing. In this instance either of the nozzle ring and the shroud plate may move relative to the other and apertures are provided in the nozzle ring to allow bypass flow into the chamber. The apertures may also serve to reduce any pressure difference across the wall of the nozzle ring.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A variable geometry turbine comprising:
a turbine housing having an inlet and an outlet;
a turbine wheel arranged for rotation about an axis in the housing between the inlet and outlet;
the inlet comprising a substantially annular inlet passageway defined between a substantially radial face of a first wall and a facing second wall of the housing, the walls being movable relative to one another along the turbine axis to vary the size of the inlet passageway;
a substantially annular array of vanes extending across the inlet passageway for directing exhaust gas flow towards the turbine wheel, each vane being fixed to one of the first and second walls, and a respective opening for receiving each vane being provided the other of the first and second walls to accommodate said relative movement of the walls;
a chamber adjacent to the second wall, the second wall being disposed between the chamber and the first wall;
a wastegate port at the chamber providing communication between the chamber and the outlet of the turbine housing; and
a bypass path being provided from the inlet passageway to the chamber for exhaust gas to bypass the turbine wheel and to exit through the wastegate port.

2. A variable geometry turbine according to claim 1, wherein the wastegate port is provided at an end of the chamber distal from the second wall.

3. A variable geometry turbine according to claim 1, wherein the chamber is substantially annular.

4. A variable geometry turbine according to claim 1, wherein the chamber is defined by the housing.

5. A variable geometry turbine according to claim 1, wherein the wastegate port is provided at a distance from the axis that is substantially equal to or less than the distance of the vanes from the axis.

6. A variable geometry turbine according to claim 1, wherein the wastegate port is defined in a wall that defines an exducer passage of the outlet.

7. A variable geometry turbine according to claim 1, wherein the first and second walls are movable relative to one another between a first position in which they are spaced apart to define a relatively wide annular inlet passageway and a second position in which the they are proximate so as to define a relatively narrow annular inlet passageway.

8. A variable geometry turbine according to claim 7, wherein the bypass path is provided, at least in part, by the openings in the second wall.

9. A variable geometry turbine according to claim 8, wherein the vanes have an end that is cut away such that it has a reduced vane chord.

10. A variable geometry turbine according to claim 9, wherein in the second position of the first and second walls there is negligible peripheral clearance between the vanes and edges of the openings such that the bypass path is substantially closed and in the first position of the walls the cut away end of each vane occupies the respective opening such that the clearance between the vanes and the edges of the openings is larger than in said first position thereby ensuring the bypass path is open.

11. A variable geometry turbine according to claim 7, wherein the wastegate port is selectively closable by a valve that is operable independently of the relative movement of the walls.

12. A variable geometry turbine according to claim 11, wherein in the closed position the valve rests on a valve seat that is defined in a wall adjacent to an exducer passage portion of the outlet.

13. A variable geometry turbine according to claim 11, wherein the valve comprises a moveable member disposed in the outlet, the member having a port and being moveable between an open position in which the port is in communication with the wastegate port so as to allow flow of gas through the bypass path to the outlet and a closed position in which the port is blocked by the sleeve so as to prevent such flow.

14. A variable geometry turbine according to claim 13, wherein the movable member comprises a sleeve.

15. A variable geometry turbine according to claim 14, wherein the sleeve is slidably movable between the open and closed positions.

16. A variable geometry turbine according to claim 15, wherein the sleeve is rotatably movable between the open and closed positions.

17. A variable geometry turbine according to claim 14, wherein the movable member is an inner sleeve that is received in a fixed outer sleeve.

18. A variable geometry turbine according to claim 17, wherein at least part of the wastegate port is defined by a clearance between the outer sleeve and a wall of the turbine housing that defines the outlet.

19. A variable geometry turbine according to claim 18, wherein the clearance is a recess in a surface of the fixed sleeve.

20. A variable geometry turbine according to claim 1, wherein the inlet comprises an inlet chamber for delivering exhaust gas to the inlet passageway and the bypass path is defined, at least in part, between the inlet chamber and the chamber adjacent to the second wall.

21. A variable geometry turbine according to claim 20, wherein the inlet chamber is radially outboard of the inlet passageway.

22. A variable geometry turbine according to claim 20, wherein a bypass port is provided between the inlet chamber and the chamber adjacent to the second wall.

23. A variable geometry turbine according to claim 1, wherein the inlet comprises an inlet chamber for delivering exhaust gas to the inlet passageway and the bypass path is defined, at least in part, between the inlet chamber and the chamber adjacent to the second wall, a bypass port is provided between the inlet chamber and the chamber adjacent to the second wall, a valve member is provided inside the chamber and connected to at least one of the vanes, the valve member is movable over the bypass port such that when the walls are in the second position the valve member blocks gas communication between the bypass port and the wastegate port and when the walls are in the first position the valve member is clear of the bypass port so that bypass gas can flow from the inlet chamber through the bypass port along the bypass path to the outlet exducer passage via the wastegate port.

24. A variable geometry turbine according to claim 23, wherein the valve member is in the form of at least one piston connected to at least one of the vanes.

25. A variable geometry turbine according to claim 24, wherein the at least one piston is defined at or near the end of at least one of the vanes.

26. A variable geometry turbine according to claim 25, wherein a piston is defined at the end of each of the vanes.

27. A variable geometry turbine according to claim 23, wherein the valve member is sealed to the interior of the chamber adjacent to the second wall.

28. A variable geometry turbine according to claim 1, wherein the vanes are fixed to the first wall and the respective openings for receiving the vanes are provided in the second wall, the chamber accommodating the vanes that project through the openings.

29. A variable geometry turbine according to claim 1, wherein the second wall is defined by a shroud plate.

30. A variable geometry turbine according to claim 1, wherein the first wall is defined by a nozzle ring.

31. A turbocharger comprising a variable geometry turbine according to claim 1 and drivingly connected to a compressor.

32. A turbocharger according to claim 31 and fitted to an internal combustion engine.

33. A method for operating a variable geometry turbine in which the size of an inlet passageway defined between a substantially radial face of a first wall and a facing second wall of a housing of the turbine is varied by moving the walls relative to one another along the turbine axis, further comprising the steps of using a plurality of vanes fixed one of the first and second walls and extending across, the inlet passageway outside the turbine wheel to direct exhaust gas flow toward the turbine wheel, the vanes passing through openings in the other of the first and second walls to accommodate the relative movement, a chamber being provided adjacent to one side of the second wall, and selectively opening a bypass path so as to allow at least a portion of the exhaust gas to bypass the turbine through the chamber and to exit through a wastegate port in the chamber.

34. A method according to claim 33, wherein the openings are in the second wall and define a portion of the bypass path, the path being opened and closed by relative movement of the vanes and the openings between a first position in which there is a significant clearance between the vanes and the openings so as to open the bypass path and a second position in which the vanes substantially close the openings and therefore the bypass path.

35. A method according to claim 34, wherein the bypassing gas is allowed to enter the chamber through a port defined between the chamber and an inlet chamber of the inlet.

36. A method according to claim 33, wherein a valve is used to selectively open the bypass path.

37. A method according to claim 36, wherein a movable sleeve in the turbine outlet is selectively movable to open and close the wastegate port and therefore the bypass path.

38. A method according to claim 33, further comprising moving the first and second walls relative to one another so as to reduce the size of the inlet passageway such that the vanes are received, at least partially, within the chamber.

* * * * *

UNITED STATES PATENT AND TRADEMARK OFFICE
CERTIFICATE OF CORRECTION

| | | |
|---|---|---|
| PATENT NO. | : 8,191,368 B2 | Page 1 of 1 |
| APPLICATION NO. | : 12/848729 | |
| DATED | : June 5, 2012 | |
| INVENTOR(S) | : Stephen Garrett and John Parker | |

It is certified that error appears in the above-identified patent and that said Letters Patent is hereby corrected as shown below:

Title Page, below Item (65) insert

-- (30)    Foreign Application Priority Data

February 1, 2008    (GB)..........................0801846.7 --

Signed and Sealed this
Twentieth Day of May, 2014

Michelle K. Lee
*Deputy Director of the United States Patent and Trademark Office*